(12) United States Patent
Nadgowda et al.

(10) Patent No.: US 12,204,637 B2
(45) Date of Patent: Jan. 21, 2025

(54) COMPLIANCE PROFILING

(71) Applicant: International Business Machines Corporation, Armonk, NY (US)

(72) Inventors: Shripad Nadgowda, Elmsford, NY (US); Fabio Abreu Oliveira, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 17/209,603

(22) Filed: Mar. 23, 2021

(65) Prior Publication Data

US 2022/0309149 A1   Sep. 29, 2022

(51) Int. Cl.
*H04L 29/06*   (2006.01)
*G06F 21/52*   (2013.01)

(52) U.S. Cl.
CPC ........ *G06F 21/52* (2013.01); *G06F 2221/033* (2013.01)

(58) Field of Classification Search
CPC ............................ G06F 21/52; G06F 2221/033
See application file for complete search history.

(56) References Cited

U.S. PATENT DOCUMENTS

| | | | |
|---|---|---|---|
| 9,665,465 B1 | 5/2017 | Jain | |
| 10,200,358 B2 | 2/2019 | Lander | |
| 10,454,934 B2 | 10/2019 | Parimi | |
| 10,574,513 B2 | 2/2020 | Nagarajan | |
| 10,586,042 B2 | 3/2020 | Stopel | |
| 10,803,166 B1 | 10/2020 | Terkowitz | |
| 2013/0263206 A1* | 10/2013 | Nefedov | G06F 21/604 726/1 |
| 2018/0004936 A1* | 1/2018 | Bender | G06F 21/51 |
| 2019/0318100 A1* | 10/2019 | Bhatia | G06F 21/57 |
| 2020/0326931 A1 | 10/2020 | Nadgowda | |
| 2021/0211445 A1* | 7/2021 | Albero | H04L 63/1433 |

OTHER PUBLICATIONS

Dai et al., "Data Profiling Technology of Data Governance Regarding Big Data: Review and Rethinking", printed on Feb. 18, 2021, 13 pages.

(Continued)

*Primary Examiner* — Evans Desrosiers
(74) *Attorney, Agent, or Firm* — Intelletek Law Group, PLLC; Gabriel Daniel, Esq.

(57) ABSTRACT

A computer implemented method for compliance profiling, the method comprising creating an application security profile indicating a set of permissions enabled for a corresponding application, associating one or more source files corresponding to the application to a running workload, executing the running workload, capturing a workload security profile with respect to one or more operations executed by the running workload, wherein the workload security profile indicates a set of permissions utilized by the running workload, comparing the workload security profile and the application security profile to identify one or more differences, and recommending a change to the application security profile according to the identified one or more differences.

17 Claims, 3 Drawing Sheets

(56) References Cited

OTHER PUBLICATIONS

Disclosed Anonymously, "Context-aware VM and application adaptation", An IP.com Prior Art Database Technical Disclosure, IP.com No. IPCOM000239592D, IP.com Electronic Publication Date: Nov. 18, 2014, 6 pages.

Disclosed Anonymously, "Method and system for policy based security and compliance management for cloud environments", An IP.com Prior Art Database Technical Disclosure, IP.com No. IPCOM000220537D, IP.com Electronic Publication Date: Aug. 6, 2012, 10 pages.

Disclosed Anonymously, "Workload Discovery and Recommendations for Cloud Migration with AI", An IP.com Prior Art Database Technical Disclosure, IP.com No. IPCOM000263649D, IP.com Electronic Publication Date: Sep. 23, 2020, 11 pages.

Hassan et al., "Microservice transition and its granularity problem: A systematic mapping study", Survey Paper, Wiley, Accepted: May 17, 2020, 31 pages.

Hwang et al., "Shift-Left Security Risk Analysis", U.S. Appl. No. 17,249,997, Filed on Mar. 22, 2021, 33 pages.

Raesene, "Docker Capabilities and no new-privileges", Jun. 1, 2019, 3 pages, <https://raesene.github.io/blog/2019/06/01/docker-capabilities-and-no-new-privileges>.

International Searching Authority, Patent Cooperation Treaty, Notification of Transmittal of the International Search Report and the Written Opinion of the International Searching Authority, or the Declaration, Date of mailing Jun. 28, 2022 (Jun. 28, 2022), International application No. PCT/EP2022/056729, International filing date Mar. 15, 2022 (Mar. 15, 2022), 11 p.

"Compliance Profiling", European Application No. EP2022/056729, IBM Docket No. P202009704PCT01, filed on Mar. 15, 2022, 17 pages.

\* cited by examiner

COMPLIANCE PROFILING

BACKGROUND

The present invention relates generally to the field of security compliance, and more specifically to altering application privileges according to a running workload.

Common security requirements include exercising least privilege or right privilege. The principle of least privilege refers to an information security concept in which a user is given a minimum level of access, or permissions, needed to execute his or her job functions. This principle can be provided to both users and applications; in other words, with respect to an application, a user may be provided least privilege to accomplish only tasks associated with his or her role. Similarly, with respect to a system, an application may be granted privilege to impact only system elements which that application is intended to manage or control.

SUMMARY

As disclosed herein, a computer implemented method for compliance profiling includes comprising creating an application security profile indicating a set of permissions enabled for a corresponding application, associating one or more source files corresponding to the application to a running workload, executing the running workload, capturing a workload security profile with respect to one or more operations executed by the running workload, wherein the workload security profile indicates a set of permissions utilized by the running workload, comparing the workload security profile and the application security profile to identify one or more differences, and recommending a change to the application security profile according to the identified one or more differences. A computer program product and computer system corresponding to the method are also disclosed.

DETAILED DESCRIPTION

With respect to system access, security permissions are often overly permissive initially. For example, consider a developer who wants to mount a filesystem. The developer may run a container as "privilege=true", where in fact he may only need "CAP_SYS_ADMIN" capability. Overextensions of privileges such as this are fairly common. Additionally, with respect to certain malicious containers wherein some processes are elevating their own privileges, discovery and remediation of this problem is not always obvious. Generally, some security controls can be a moving target; while some security protocols may include specific indications of what is to be allowed or prevented, other protocols may recite in a generalized manner such as "ensuring no vulnerabilities". As a system and its applications change, "ensuring no vulnerabilities" can take on a very different form. Similarly, "least privileges" can take on different forms depending on a current state of an application and operations required to be executed by said application. Dynamic security control requirements such as these may require continuous compliance examination.

The present invention will now be described in detail with reference to the Figures. Implementation of embodiments of the invention may take a variety of forms, and exemplary implementation details are discussed subsequently with reference to the Figures.

Figure 1:
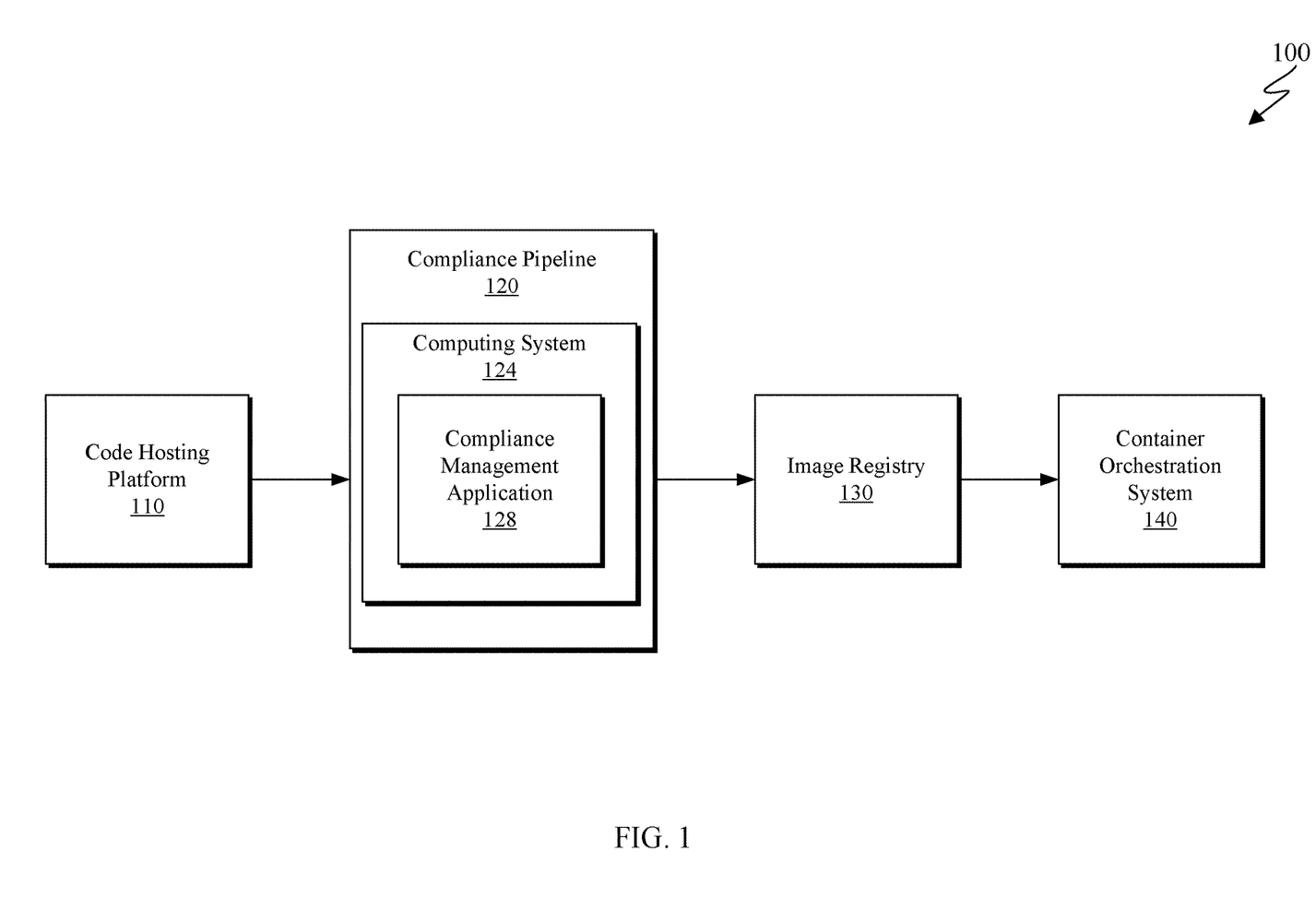
FIG. 1 is a block diagram depicting a compliance management system in accordance with at least one embodiment of the present invention.

FIG. 1 is a block diagram depicting a compliance control system 100 in accordance with at least one embodiment of the present invention. As depicted, compliance control system 100 includes a code hosting platform 110, a compliance pipeline 120, an image registry 130, and a container orchestration system 140. Compliance control system 100 may enable security control to be tailored to multiple applications separately and automatically in a system.

Code hosting platform 110 may be a service or platform that stores uploaded copies of source code repositories. Code hosting platform 110 may correspond to a source code manager. In at least some embodiments, code hosting platform 110 is a version control system; in other words, code hosting platform 110 may be a software configured to allow programmers to track revisions to a code during software development.

Compliance pipeline 120 may include a system or application configured to monitor and manage security compliance within compliance control system 100 in accordance with at least one embodiment of the present invention. As depicted, compliance pipeline 120 includes computing system 124. Computing system 124 can be a desktop computer, a laptop computer, a specialized computer server, or any other computer system known in the art. In some embodiments, computing system 124 represents computer systems utilizing clustered computers to act as a single pool of seamless resources. In general, computing system 124 is representative of any electronic device, or combination of electronic devices, capable of receiving and transmitting data, as described in greater detail with regard to FIG. 3. Computing system 124 may include internal and external hardware components, as depicted and described in further detail with respect to FIG. 3.

As depicted, computing system 124 includes compliance management application 128. Compliance management application 128 may be configured to monitor and manage security permissions corresponding to the connected applications and systems within compliance management system 100. In general, compliance management application 128 may correspond to any application capable of executing steps in accordance with a compliance control method. One example of an appropriate compliance control method is described with respect to compliance control method 200 of FIG. 2.

Image registry 130 may be a container image registry associated with container orchestration system 140. In at least some embodiments, image registry 130 is a service that stores container images. Image registry 130 may be hosted as a private or public registry, or may be hosted by a third party. In some embodiments, image registry 130 may be integrated directly with container orchestration system 140.

Container orchestration system 140 is a system configured to automate manual processes involved in deploying, managing, and scaling containerized applications. In other words, container orchestration system 140 is configured to cluster together groups of hosts running a same container, and these clusters as a whole can then be efficiently managed together. In general, container orchestration system 140 can be any system or application capable of monitoring and facilitating management of containerized workloads and systems.

Communications between code hosting platform 110, compliance pipeline 120, image registry 130, and container orchestration system 140 may be facilitated by a network (not pictured). The network can be, for example, a local area network (LAN), a wide area network (WAN) such as the Internet, or a combination of the two, and include wired, wireless, or fiber optics connections. In general, the network can be any combination of connections and protocols that will support communications between code hosting platform 110, compliance pipeline 120, image registry 130, and container orchestration system 140.

Figure 2:
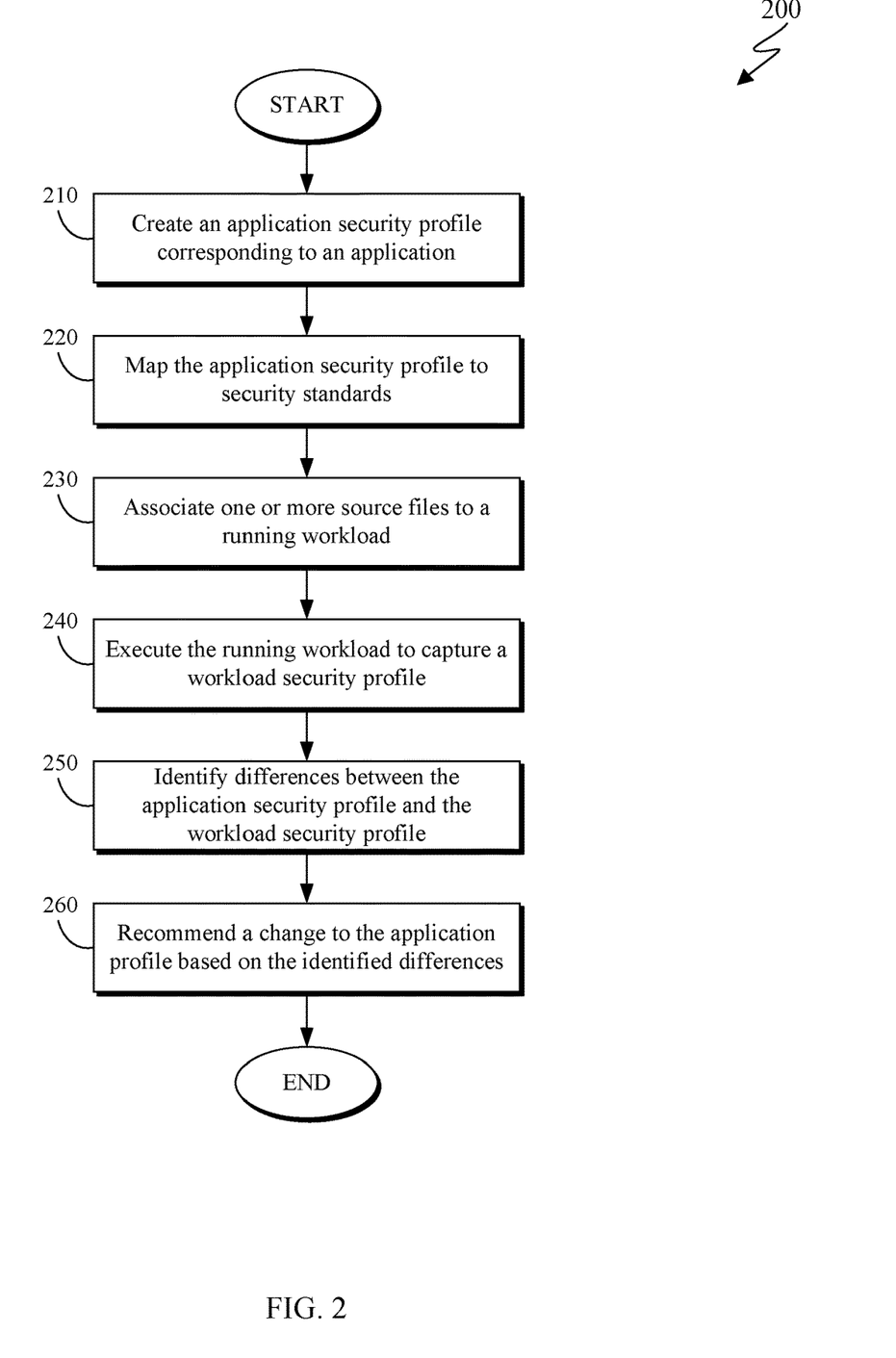
FIG. 2 is a flowchart depicting a compliance management method in accordance with at least one embodiment of the present invention.

FIG. 2 is a flowchart depicting a compliance control method 200 in accordance with at least one embodiment of the present invention. As depicted, compliance control method 200 includes creating (210) an application security profile, mapping (220) the application security profile to security standards, associating (230) one or more source files to a running workload, executing (240) the running workload to capture a workload security profile, identifying (250) differences between the application security profile and the workload security profile, and recommending (260) a change to the application profile. Compliance control method 200 may enable improved compliance control in systems with multiple applications.

Creating (210) an application security profile may include analyzing an application to identify one or more security features of interest. The application security profile may include an indication of what security permissions are necessary for the application to properly run. In some embodiments, the application security profile may include an indication of one or more operations the application must be allowed to execute to ensure proper functioning. In at least some embodiments, an application security profile includes a list of permissions and accessible files corresponding to the application. The application security profile may additionally include information regarding conditions a user must meet to be granted certain permissions with respect to the subject application. In at least one embodiment, creating (210) an application security profile includes analyzing the application's deployment to determine existing security conditions. Creating (210) an application security profile may additionally include identifying build configuration source files of the application, and analyzing these source files to identify any security conditions corresponding to the source files. In at least some embodiments, creating (210) an application security profile includes analyzing source artifacts corresponding to the application found in repositories. In at least some embodiments, the security profile includes a list of file accesses and permissions. The security profile may additionally include a list of system calls made. In at least some embodiments, creating (210) an application security profile includes parsing static manifests and generating an "allowed capabilities list". In at least some embodiments, the allowed capabilities list includes all permissions and configurations associated with an application. Creating (210) an application security profile may occur during application development.

Mapping (220) the application security profile to security standards may include determining whether the created security profile adheres to known security protocols. For example, in a case where the application has been created and exists in an environment requiring that the security standards recommended by the National Institute of Standards and Technology (NIST) be met, the application security profile is mapped as NIST compliant. Similarly, if the application adheres to all of the recommended security standards as set out by the Center for Internet Security (CIS), the application security profile is mapped as CIS compliant. Mapping (220) the application security profile to security standards enables expedient identification of compliance in environments where standard security protocols are required.

Associating (230) one or more source files to a running workload may include identifying a running workload corresponding to the application source files. In at least some embodiments, the one or more source code files include code containing application logic, code for building logic, or code for deploying an application. In at least some embodiments, associating (230) one or more source files to a running workload includes identifying one or more active processes corresponding to each of the one or more source files. In at least some embodiments, associating (230) one or more source files to a running workload may include tracking the provenance of code corresponding to the source files in a corresponding image or container. Associating (230) one or more source files to a running workload may further include tracking and maintaining the mapping of the one or more source files through to the running instance of the application, such that various dependences are maintained.

Executing (240) the running workload to capture a workload security profile may include monitoring the operations being executed in correspondence with the running workload. In at least some embodiments wherein the running workload is controlled by a compliance management application, executing (240) the running workload may include explicitly commencing the execution of the workload and subsequently monitoring the corresponding operations. In other embodiments wherein the running workload does not fall under the control of the compliance management application, executing (240) the running workload may simply include monitoring the already running workload, or waiting for the workload to initiate and monitoring the workload once corresponding operations do begin to execute. In general, executing (240) the running workload to capture a workload security profile may include any set of operations that ultimately include identifying operations currently executing with respect to the running workload. Additionally, executing (240) the running workload may include identifying a set of permissions that must be enabled to allow the execution of the observed operations. In some embodiments, executing (240) the running workload includes compiling the identified set of permissions or privileges into a profile indicating the security characteristics of the running workload, hereby referred to as the workload security profile. In at least some embodiments, the security profile includes a list of file accesses and permissions. The security profile may additionally include a list of system calls made. In at least some embodiments, executing (240) the running workload includes monitoring and generating a "used cap list" at run time.

Determining (250) whether there are any differences between the application security profile and the workload security profile may include comparing the application security profile and the workload security profile. In some embodiments, determining (250) whether there are any differences between the application security profile and the workload security profile includes determining whether one of the profiles complies with a set of security standards that the other does not. Determining (250) whether there are any differences between the application security profile and the workload security profile may additionally include executing a line by line comparison of the operations that are allowed by the application security profile and the operations that are allowed by the workload security profile, and determining whether there is a difference between the two sets of operations. In general, determining (250) whether there are any differences between the application security profile and the workload security profile includes identifying any disparity in privileges between the two profiles. If it is determined that there are indeed differences between the application security profile and the workload security profile (250, yes branch), the method continues by recommending (260) a change to the application profile. If it is determined that there are not differences between the application security profile and the workload security profile (250, no branch), the method continues by returning to executing (240) the running workload.

Recommending (260) a change to the application profile may include providing an indication of the security conditions or privileges which differ between the application security profile and the workload security profile. In at least some embodiments, recommending (260) a change includes identifying an action which can be taken to eliminate one or more differences between the application security profile and the workload security profile. Consider a simple example in which security can be broken into three levels: level 1, which is the least permissive level and gives the least privileges, level 2, which gives an intermediate number of privileges, and level 3, which is the most permissive level and gives the most privileges of the three levels. In such an example, consider a situation where the application profile indicates that the application has level 2 privileges, but the workload profile indicates that the actions being executed by the application only comprise actions permitted by level 1 privileges. In such an example, recommending (260) a change to the application profile includes recommending that the application profile be adjusted such that the application only has level 1 privileges, and any corresponding security compliances be adjusted accordingly. In at least some embodiments, wherein a compliance control manager has capabilities to alter the privileges of applications within the system, recommending (260) a change to the application profile may further include executing the recommended change with respect to the application profile.

In at least some embodiments (not pictured), compliance control method 200 may be executed continuously; in other words, compliance control method 200 occurs iteratively in parallel with ongoing operation of the corresponding system or application to ensure ongoing compliance as long as the system or application is running. In such embodiments, compliance control method 200 may conclude with an additional step of determining whether the system or application is still running. If it is determined that the system or application is still operational, the method may return to executing (240) the running workload. In some embodiments, such as those wherein a new source file is added or a security requirement itself has changed, the method may return instead to any of steps 210-230 as appropriate to update information according to the new source file, newly changed security requirement, etc. If it is determined that the system or application is no longer operating, the method may conclude. It should also be appreciated that compliance control method 200 may begin execution as soon as an application is in developmental stages, such that it may monitor and track the application source files as necessary.

In at least some embodiments (not pictured), compliance control method 200 is an automated method. In other words, compliance control method 200 may occur responsive to a trigger event, enabling assurances that compliance control method 200 runs automatically whenever the system or application reflects a desired condition. For example, compliance control method 200 may be configured to execute any time the system has received data that includes some form of sensitive or secure data. By executing responsive to the receipt of sensitive or secure data, or an otherwise sensitive or secure request, compliance control method can ensure that any time the system or application has access to sensitive or secure data, compliance is controlled and monitored according to compliance control method 200.

Figure 3:
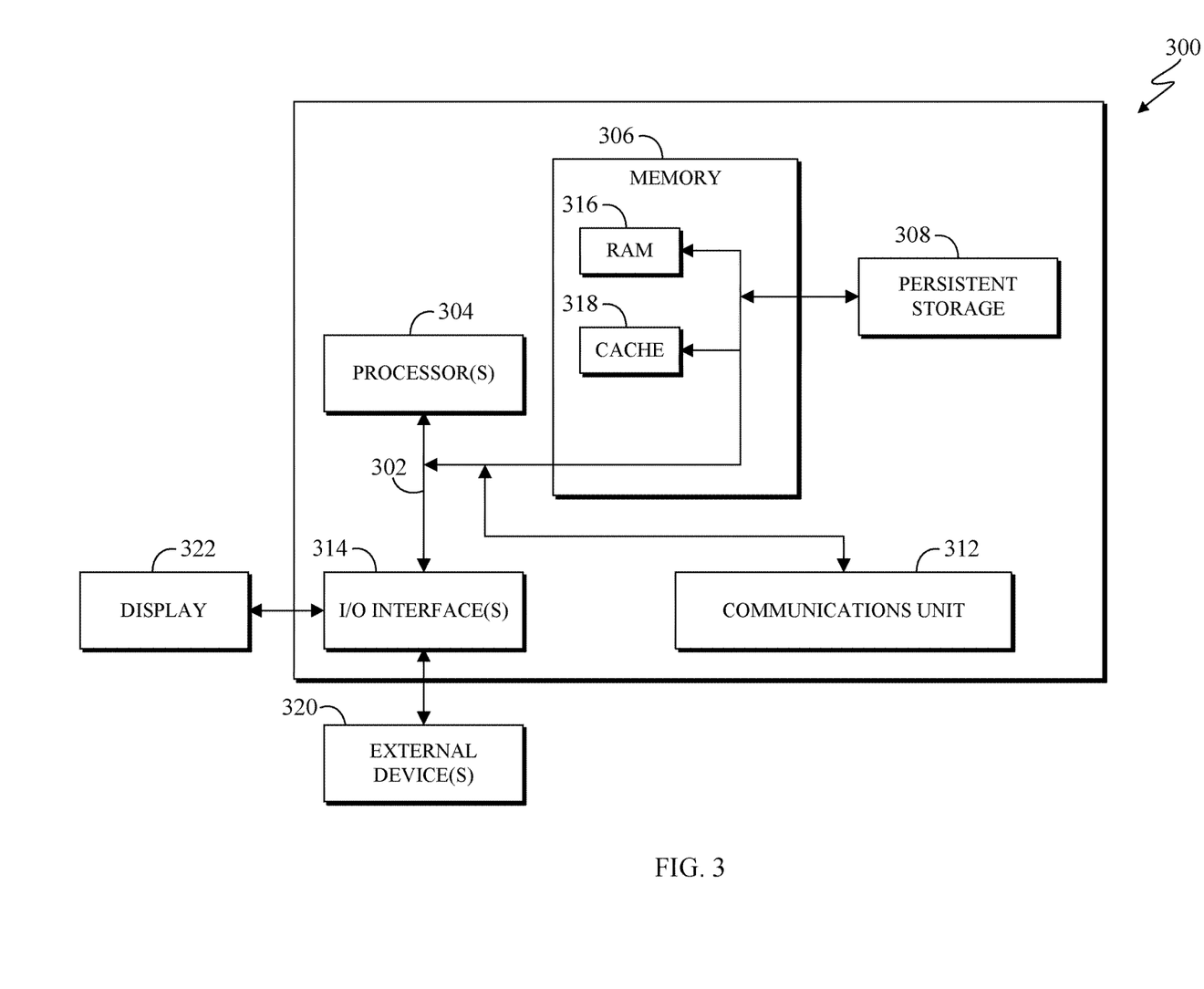
FIG. 3 is a block diagram of components of a computing system in accordance with an embodiment of the present invention.

FIG. 3 depicts a block diagram of components of computing system 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for continuous compliance profiling, the method comprising:
    creating an application security profile indicating a set of permissions enabled for an application, comprising identifying and analyzing source artifacts corresponding to the application within repositories;
    associating an already running workload with one or more source files of the application;
    executing the already running workload;
    capturing a workload security profile with respect to one or more operations executed by the already running workload, wherein the workload security profile indicates a set of permissions utilized by the running workload;
    continuously comparing the workload security profile of the already running workload and the application security profile to identify one or more differences; and
    recommending a change to the application security profile according to the identified one or more differences.

2. The computer implemented method of claim 1, further comprising altering the application security profile according to the recommended change.

3. The computer implemented method of claim 1, further comprising mapping the application security profile to one or more security standards.

4. The computer implemented method of claim 1, further comprising monitoring the running workload to identify one or more executed operations with respect to the running workload.

5. The computer implemented method of claim 4, wherein capturing a workload security profile includes identifying one or more privileges required for the one or more executed operations to properly execute.

6. The computer implemented method of claim 2, further comprising adjusting one or more security standard compliances according to the altered application security profile.

7. A computer program product for, the computer program product comprising:
    one or more computer readable storage media and program instructions stored on the one or more computer readable storage media, the program instructions comprising instructions to:
    create an application security profile indicating a set of permissions enabled for an application, comprising identifying and analyzing source artifacts corresponding to the application within repositories;
    associate an already running workload with one or more source files of the application;
    execute the already running workload;
    capture a workload security profile with respect to one or more operations executed by the already running workload, wherein the workload security profile indicates a set of permissions utilized by the already running workload;
    continuously compare the workload security profile of the already running workload and the application security profile to identify one or more differences; and
    recommend a change to the application security profile according to the identified one or more differences.

8. The computer program product of claim 6, further comprising instructions to alter the application security profile according to the recommended change.

9. The computer program product of claim 6, further comprising instructions to map the application security profile to one or more security standards.

10. The computer program product of claim 6, further comprising instructions to monitor the running workload to identify one or more executed operations with respect to the running workload.

11. The computer program product of claim 10, wherein instructions to capture a workload security profile include instructions to identify one or more privileges required for the one or more executed operations to properly execute.

12. The computer program product of claim 7, further comprising instructions to adjust one or more security standard compliances according to the altered application security profile.

13. A computer system for, the computer system comprising:
    one or more computer processors;
    one or more computer-readable storage media;
    program instructions stored on the computer-readable storage media for execution by at least one of the one or more processors, the program instructions comprising instructions to:
    create an application security profile indicating a set of permissions enabled for an application, comprising identifying and analyzing source artifacts corresponding to the application within repositories;
    associate an already running workload with one or more source files of the application;
    execute the already running workload;
    capture a workload security profile with respect to one or more operations executed by the already running workload, wherein the workload security profile indicates a set of permissions utilized by the already running workload;
    continuously compare the workload security profile of the already running workload and the application security profile to identify one or more differences; and
    recommend a change to the application security profile according to the identified one or more differences.

14. The computer system of claim 13, further comprising instructions to alter the application security profile according to the recommended change.

15. The computer system of claim 13, further comprising instructions to map the application security profile to one or more security standards.

16. The computer system of claim 13, further comprising instructions to monitor the running workload to identify one or more executed operations with respect to the running workload.

17. The computer system of claim 16, wherein instructions to capture a workload security profile include instructions to identify one or more privileges required for the one or more executed operations to properly execute.

\* \* \* \* \*